United States Patent [19]

Ishida et al.

[11] Patent Number: 4,771,393
[45] Date of Patent: Sep. 13, 1988

[54] ELECTRONIC THERMOMETER WITH MULTI RANGE MEASUREMENT CAPABILITY

[75] Inventors: Junichi Ishida, Kyoto; Tamio Miyake, Otokuni, both of Japan

[73] Assignee: Omron Tateisi Electronics Co., Kyoto, Japan

[21] Appl. No.: 88,009

[22] Filed: Aug. 18, 1987

Related U.S. Application Data

[63] Continuation of Ser. No. 820,638, Jan. 21, 1986, abandoned.

[30] Foreign Application Priority Data

Jan. 21, 1985 [JP] Japan .................... 60-9579

[51] Int. Cl.$^4$ ............... G01K 13/00; G06F 15/20
[52] U.S. Cl. ................... 364/557; 307/117; 374/102; 374/167; 374/170
[58] Field of Search ............ 374/170, 102; 103; 364/557; 331/66; 307/110; 377/25

[56] References Cited

U.S. PATENT DOCUMENTS

| | | | |
|---|---|---|---|
| 3,872,728 | 3/1975 | Joyce et al. ................... | 374/170 |
| 4,099,413 | 7/1978 | Ohte et al. ................... | 374/175 |
| 4,150,573 | 4/1979 | Dinums et al. ................ | 331/66 X |
| 4,423,968 | 1/1984 | Nemcek, Jr. et al. ........... | 374/170 |
| 4,428,528 | 1/1984 | Renault ....................... | 364/557 X |
| 4,493,565 | 1/1985 | Saka .......................... | 374/170 X |
| 4,551,031 | 11/1985 | Ishikawa et al. .............. | 377/25 X |
| 4,565,456 | 1/1986 | Iida et al. ................... | 374/170 X |
| 4,602,871 | 7/1986 | Hanaoka ....................... | 374/170 X |

FOREIGN PATENT DOCUMENTS 2911174 3/1979 Fed. Rep. of Germany .

Primary Examiner—Daniel M. Yasich
Attorney, Agent, or Firm—Stevens, Davis, Miller & Mosher

[57] ABSTRACT

The thermometer includes an oscillation unit having a time constant circuit with a compound resistor including a reference resistor and a temperature sensitive resistor. The compound resistor is switched between the reference and temperature sensitive resistors. A comparator compares the oscillation frequencies of the oscillation unit by switching over the compound resistor between the reference and temperature sensitive resistors at a variable sampling interval, and outputs digital data corresponding to the temperature sensed by the temperature sensitive resistor. The digital data corresponding to the sensed temperature are converted and displayed on a temperature data display unit. The resistive value of the reference resistor and the sampling time are switchable according to the range of temperature measurement. The temperature data conversion unit has several sections which are switchably selected according to particular ranges of temperature measurement. Each of these temperature data sections, upon receipt of the digital data from the comparison unit, outputs appropriate temperature data according thereto. A switching unit switches between the various sections of the temperature data conversion unit. A switching control device, in response to the output of the temperature data conversion unit, determines the range of temperature measurement, and appropriately controls the switching actions of the reference resistor, the sampling time switching unit, and the temperature data conversion means switching unit.

1 Claim, 4 Drawing Sheets

FIG.2(a)

| COUNT | TEMPERATURE |
|---|---|
| 0 | "L₁" |
| 99 | "L₁" |
| 100 | -5.0 |
| 300 | 15.0 |
| 500 | 35.0 |
| 501 | "H₁" |

FIG.2(b)

| COUNT | TEMPERATURE |
|---|---|
| 0 | "L₂" |
| 99 | "L₂" |
| 100 | 35.00 |
| 300 | 37.00 |
| 500 | 39.00 |
| 501 | "H₂" |

FIG.2(c)

| COUNT | TEMPERATURE |
|---|---|
| 0 | "L₃" |
| 99 | "L₃" |
| 100 | 39.0 |
| 300 | 59.0 |
| 500 | 79.0 |
| 501 | "H" |

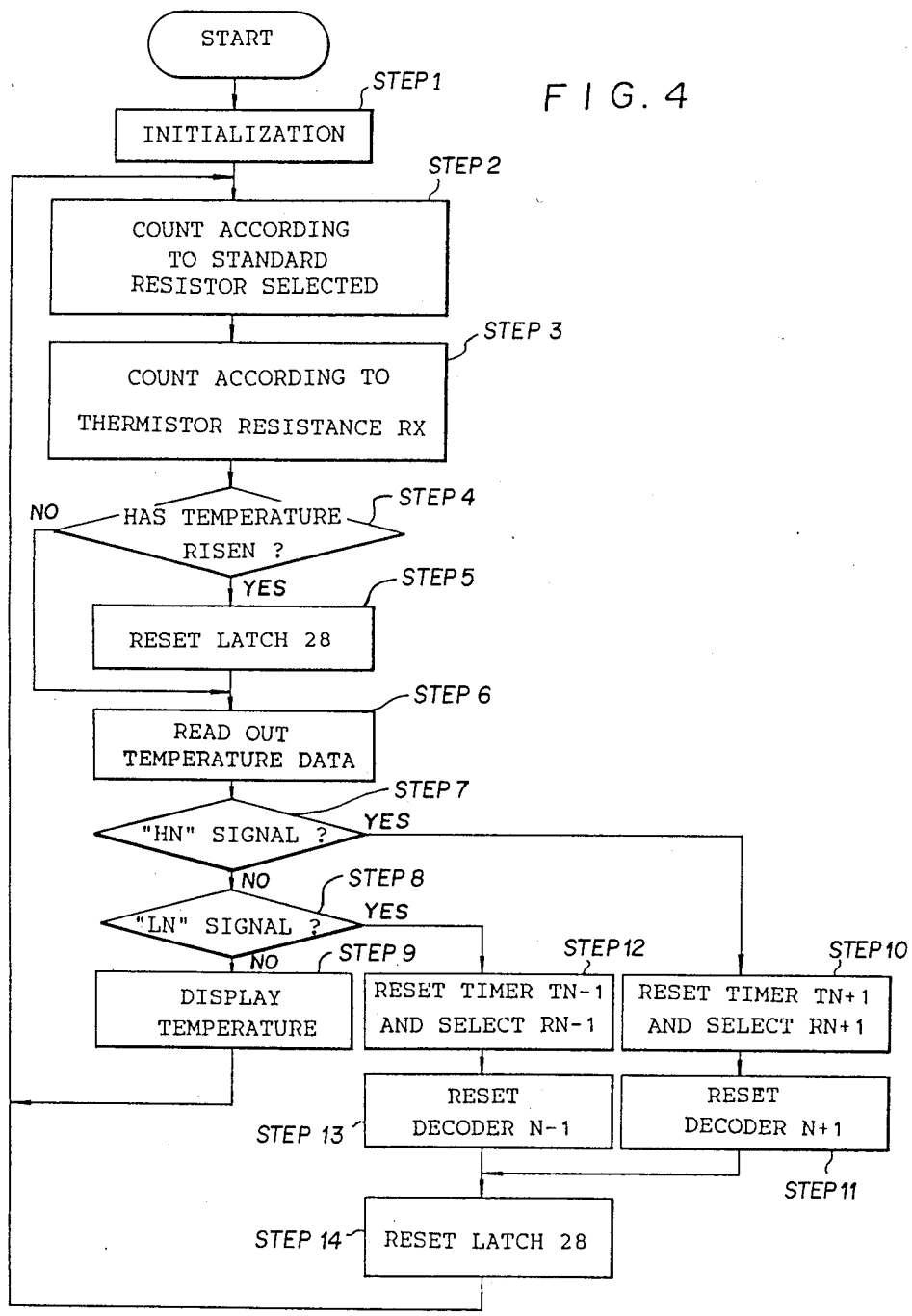

ELECTRONIC THERMOMETER WITH MULTI RANGE MEASUREMENT CAPABILITY

This application is a continuation of application Ser. No. 820,638, filed Jan. 21, 1986, now abandoned.

BACKGROUND OF THE INVENTION

The present invention relates to the field of electronic thermometers, and more specifically relates to an electronic thermometer which is capable of providing a wide range of temperature measurement and yet can provide high resolution temperature measurement within a desired temperature range.

In a conventional type of electronic thermometer, such as for example an electronic clinical thermometer, the oscillation frequencies of an oscillator unit which has a reference resistor and a temperature sensitive resistor are compared by a comparison means which switches over between the reference resistor and the temperature sensitive resistor for each sampling time, and the digital data outputted from the comparison means are inputted into a temperature data conversion means which may include a ROM or the like, and which converts these digital data for display on a display unit.

According to one particular such prior art type of electronic clinical thermometer, the measuring range is set to (as an example) 35 deg C. to 42 deg C. If the value of the measured temperature is less than the low point of this measuring range, i.e. is less than 35 deg C., then no specific indication of temperature is shown on the display unit, but only a letter "L" is displayed thereon, indicating low temperature. And similarly, if the value of the measured temperature is greater than the high point of the measuring range, i.e. is greater than 42 deg C., then again no specific indication of temperature is shown on the display unit, but only a letter "H" is displayed thereon, indicating high temperature. If the value of the measured temperature is within the measuring range, i.e. is greater than 35 deg C. and is less than 42 deg C., then a specific numerical indication of temperature is shown on the display unit, typically at a resolution of the order of 0.01 deg C. This is done in order to secure the necessary resolution power within the range of temperature which it is important to sense accurately, while maintaining the compactness and cheapness of the temperature data conversion means and of the thermometer as a whole, by reducing the amount of data needed to be stored by said temperature data conversion means.

However, a problem arises with such an electronic clinical thermometer in that the response time between the start of measurement and the appearance of a temperature reading on the display tends to be long. In other words the time interval during which the letter "L" only is visible on the display tends to be long, and the user sometimes becomes irritated with this. Further, sometimes is is desired to use the electronic clinical thermometer for another use than clinical work, i.e. for measuring temperatures which lie outside the normal range of temperature for a clinical thermometer which naturally is centered approximately around human body temperature. If in such circumstances the range of temperature measurement is expanded to, for example, −5 deg C. to 79 deg C., then, if the resolution power of the thermometer is maintained as being of the order of 0.01 deg C. which is that typically used for clinical purposes, the problem arises that the capacity of the memory of the temperature data conversion means is strained and may be exceeded. Further, if said temperature data conversion means is in any case made large enough to hold all the required data, then further problems arise in that the counter included in the comparison means is required to have a forbiddingly great number of bits, and the sampling time required for AD conversion tends to become long. Therefore, it has been difficult in the prior art to expand the range of temperature measurement available from an electronic thermometer, while maintaining the accuracy of temperature measurement, i.e. the temperature resolution, provided thereby.

SUMMARY OF THE INVENTION

Accordingly, it is the primary object of the present invention to provide an electronic thermometer, which avoids the above described problems.

It is further object of the present invention to provide such an electronic thermometer, which avoids the above identified problems.

It is a further object of the present invention to provide such an electronic thermometer, which is able to provide temperature measurement over a wide temperature range.

It is a yet further object of the present invention to provide such an electronic thermometer, which is able to provide fine resolution temperature measurement over a more limited temperature range.

It is a yet further object of the present invention to provide such an electronic thermometer, having a temperature measuring resolution which is altered according to circumstances.

It is a yet further object of the present invention to provide such an electronic thermometer, having a temperature measuring resolution which is altered according to the value of the temperature which it is measuring.

It is a yet further object of the present invention to provide such an electronic thermometer, which does not require any counter therein to have an extremely large number of bits.

It is a yet further object of the present invention to provide such an electronic thermometer, which is economical.

It is a yet further object of the present invention to provide such an electronic thermometer, which, while satisfying at least some of the above mentioned objects, is not required to have an unduly large memory capacity.

According to the present invention, these and other objects are accomplished by an electronic thermometer, comprising: an oscillation unit comprising: a time constant circuit comprising: a compound resistor means comprising a reference resistor means and a temperature sensitive resistor means; and a means for switching over said compound resistor means between said reference resistor means and said temperature sensitive resistor means; a means for comparing the oscillation frequencies of said oscillation unit by switching over said compound resistor means between said reference resistor means and said temperature sensitive resistor means every some sampling interval, and for outputting digital data corresponding to the temperature sensed by said temperature sensitive resistor means; a means for converting said data corresponding to said sensed temperature, which receives said digital data and outputs temperature data according thereto; and a means for displaying said temperature data; wherein: the resistive value of said reference resistor means is switchable according to the range of temperature measurement; the sampling time is switchable according to the range of temperature measurement; and said temperature data conversion means comprises several sections which are switchable between according to particular ranges of temperature measurement, and each of which outputs, upon receipt of said digital data from said comparison means, appropriate temperature data according thereto; and further comprising: a switching means for switching between said temperature data conversion means; and a switching control means which, in response to the output of said temperature data conversion means, determines the switching of the range of temperature measurement, and appropriately controls the switching action of said reference resistor means, the switching action of said sampling time switching means, and the switching action of said temperature data conversion means switching means.

According to such an electronic thermometer, the switching control means, upon receipt of a signal corresponding to a point of changing over of the range of temperature measurement for the temperature data conversion means, switches over the reference resistor means, the sampling time switching means, and the temperature data conversion means switching means to those for the next range of temperature measurement. Every time the measured temperature passes from one range of temperature measurement to another, this action is repeated.

BRIEF DESCRIPTION OF THE DRAWINGS

The present invention will now be shown and described with regard to the preferred embodiment thereof, and with reference to the illustrative drawings, which however should not be considered as limitative of the present invention in any way, since the scope of the present invention is to be considered as being delimited solely by the accompanying claims, rather than by any particular features of the disclosed embodimemt or of the drawings. In these drawings:

FIGS. 2a, 2b, and 2c are temperature data maps stored in the decoder of the electronic thermometer;

FIG. 4 is a flow chart showing the action of this electronic thermometer.

DESCRIPTION OF THE PREFERRED EMBODIMENT

Figure 1:
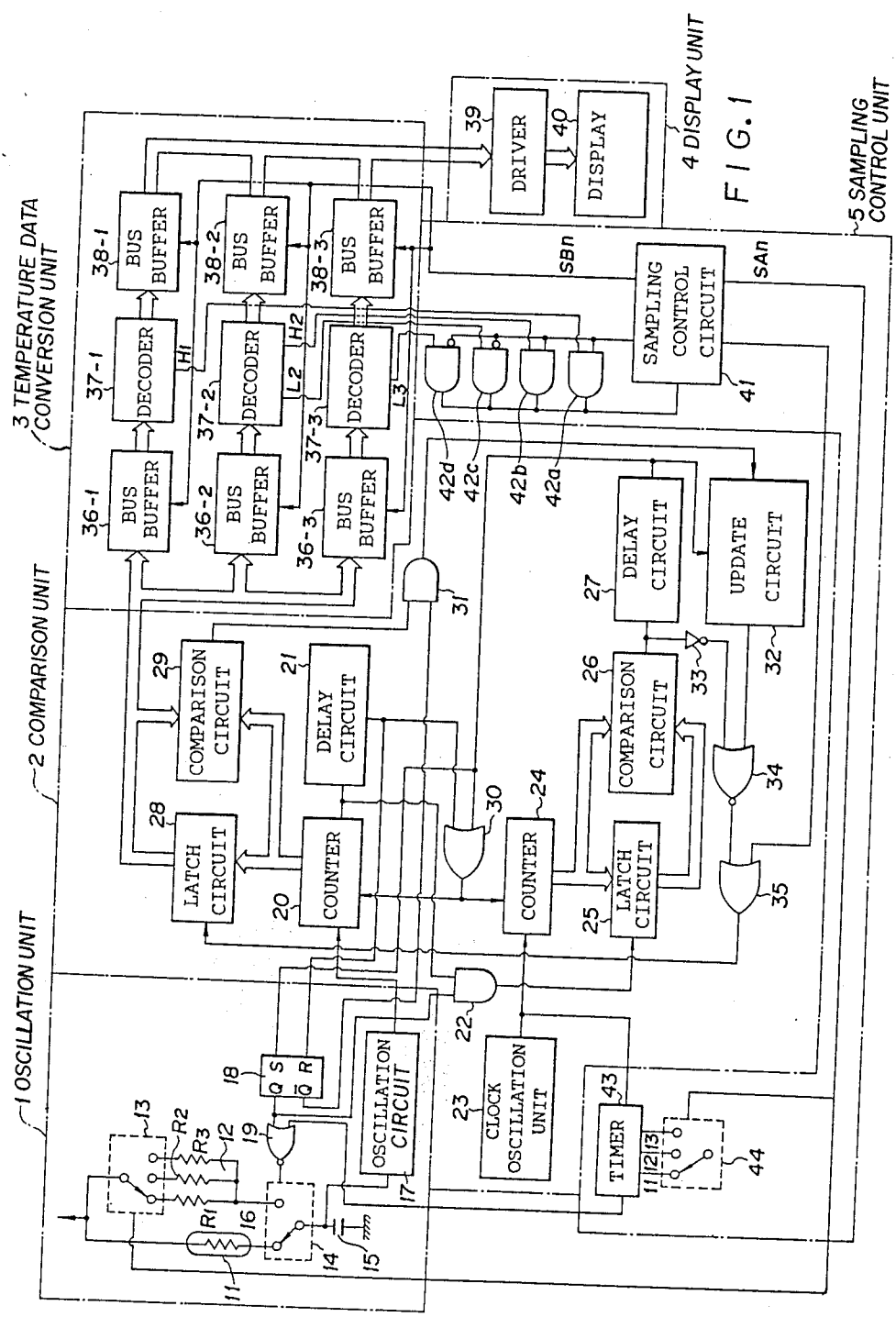
FIG. 1 is a block diagram of an electronic thermometer according to a preferred embodiment of this invention.

The present invention will now be described with reference to the preferred embodiment thereof. FIG. 1 shows a block diagram of a circuit for the preferred embodiment of the electronic thermometer of the present invention. This electronic thermometer comprises an oscillation unit 1, a comparison unit 2 for comparing the oscillation frequencies of the oscillation unit 1, a temperature data conversion unit 3 which outputs temperature data corresponding to a digital signal produced from the comparison unit 2, a display unit 4 for displaying the outputted temperature data, and a sampling control unit 5.

The oscillation unit 1 consists of a time constant circuit 16 comprising a thermistor (temperature sensitive resistor) 11, a set 12 of reference resistors R1, R2, R3 forming a reference resistor means having plural discrete resistance values, switchover switches 13 and 14, and a capacitor 15, and an oscillation circuit 17, and further comprises a flip-flop circuit 18 and a NOR circuit 19 for switching over the switch 14. The reference resistor set 12 comprises three resistors R1, R2, and R3 which may be switched over between by the switchover switch 13.

In the comparison unit 2, the output of the oscillation unit 17 is supplied to a counter 20. An overflow output of this counter 20 is not only supplied to a delay circuit 21 but also to a latch circuit 25 by way of an AND circuit 22. The output of the delay circuit 21 is supplied to a RESET terminal of the flip-flop circuit 18 of the oscillation unit 1, and throws the switch 14 towards the thermistor 11 by way of the NOR circuit 19. Further, the output of the delay circuit 21 is supplied to an OR circuit 30.

A clock signal outputted from the clock oscillation unit 23 is counted by a counter 24, and the output of this counter 24 is supplied to a latch circuit 25 and a comparison circuit 26. The clock oscillation unit 23, the counter 24, and the latch circuit 25 count the time until the counter 20 overflows, and retain, temporarily, this time.

The comparison circuit 26 compares the count of the counter 24 and the output of the latch circuit 25 and supplies an agreement signal thereof to a delay circuit 27 whose output is in turn supplied to an OR circuit 30. The output of the OR circuit 30 is supplied to the counters 24 so as to clear them. The output of the delay circuit 27 is supplied to a SET INPUT terminal of the flip-flop circuit 18 and throws the switch 14 of the oscillation unit 1 towards the reference resistor set 12 by way of the NOR circuit 19. The output of the comparison circuit 26 is inverted by an inverter 33 and is supplied to a NOR circuit 34. The output of a numerical value update control circuit 32 is supplied to the NOR circuit 34 and the output of the NOR circuit 34 is supplied to a latch circuit 28 by way of an OR circuit 25.

The output of the counter 20 is latched to the latch circuit 28 by a signal from the OR circuit 35. And the outputs of the counter 20 and the latch circuit 28 are supplied to comparison circuit 29 to be compared thereby, and an agreement output thereof is supplied to the numerical value update control circuit 32 by way of an AND circuit 31. Further, the output of the delay circuit 27 is also supplied to the numerical value update control circuit 32.

A temperature data conversion unit 3 comprises three temperature data conversion units forming plural selectable operating sections which are individually switchably selected according to a selected range of temperature measurement as discussed below. The temperature data conversion units consist of bus buffers 36-1, 36-2, and 36-3, decoders 37-1, 37-2, and 37-3, and bus buffers 38-1, 38-2, and 38-3. The digital signal from the latch circuit 28 is supplied to the bus buffers 36-1, 36-2, and 36-3 on the input ends of the temperature data conversion circuits, and one of the three temperature data conversion circuits is to be selected according to the range of temperature measurement. Each of the decoders 37-1, 37-2, and 37-3 stores the temperature data shown in FIGS. 2a, 2b, and 2c. The details thereof and their actions will be described hereinafter.

A display unit 4 comprises a driver 39 which receives temperature data from the temperature data conversion unit 3 and a display 40. This portion is not much different from conventional art, and has no special features to it.

The sampling control unit 5 comprises a sampling control circuit 41, AND circuits 42a, 42b, 42c, and 42d for taking in temperature range renewing point signals H1, L2, H2, and L3 and so on from the decoders 37-1, 37-2, and 37-3 into the sampling control circuit 41, a timer 43 for obtaining the sampling time, and a sampling time switchover switch 44.

One of the three bus buffers is selected by a signal SBn of the sampling control circuit 41, and signals SAn and SBn for changing the next range of temperature measurement are outputted from the sampling control circuit 41 according to the signals taken in from the AND circuits 42a through 42d.

Figure 3:
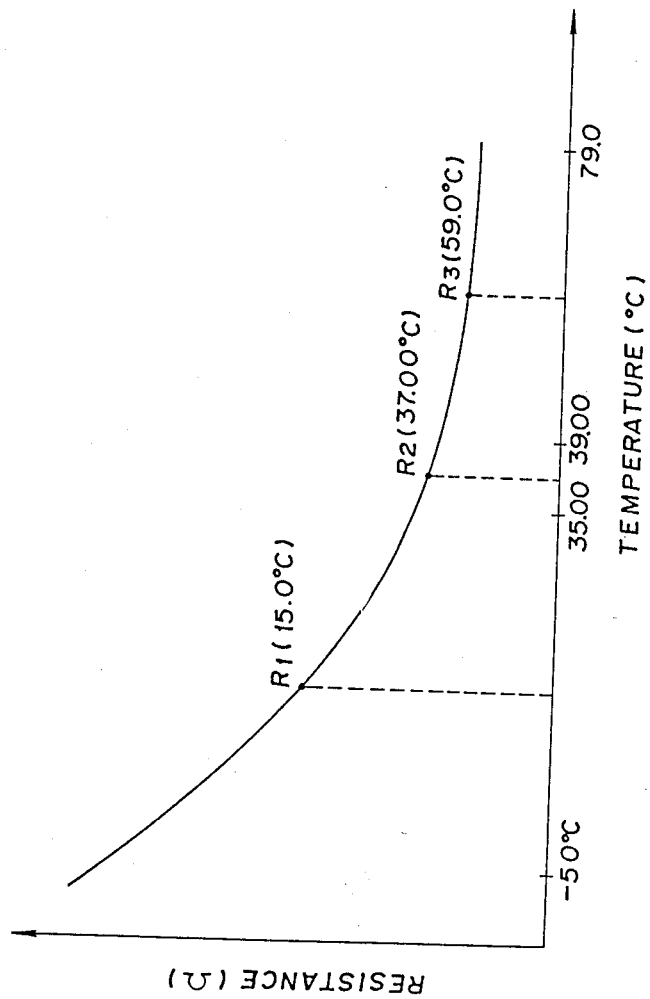
FIG. 3 is a diagram showing the temperature-resistance property of the temperature sensitive element of this preferred embodiment of the electronic thermometer of this invention.

In the electronic thermometer of this embodiment, the range of temperature measurement is divided into three ranges, a low temperature range, a medium temperature range, and a high temperature range; and the reference registers, the sampling times, and the decoders are switched over for each region. FIG. 3 shows the temperature property of the temperature sensitive resistor. In the low temperature range, since the resistive value is high and therefore the CR time constant is large, the oscillation frequency is lower; but, since the display resolution power may be low, the sampling time T1 is set to a medium value. In the medium temperature range (for instance a range for measuring body temperature), the CR time constant is a medium value, but, since the display resolution power is required to be high, the sampling time is selected to be large. And, in the high temperature range, both the CR time constant and also the display resolution power are both low, and the sampling time is selected to be small. When the sampling times are so selected that the count value variation range of the counter 20 is 400 for each range of temperature measurement, the count resolution power in each of the temperature ranges will be:

(35.0−(−5.0))/400=0.1 deg C./count in the low temperature range of from −5.0 to 35.0 deg C.;
(39.00−35.00)/400=0.01 deg C./count in the medium temperature range of from 35.00 to 39.00 deg C.; and (79.0−39.0)/400=0.1 deg C./count in the high temperature range of from 39.0 to 79.0 deg C.

From the above, the resistive values and the selection circuit for each temperature range will exemplarily be as summarized in the following table:

| Temperature range | −5.0 to 35.0 | 35.00 to 39.00 | 39.0 to 79.0 |
|---|---|---|---|
| Display resolution power | 0.1 deg C. | 0.01 deg C. | 0.1 deg C. |
| CR constant | large | medium | small |
| Sampling time | medium (T1) | large (T2) | small (T3) |
| decoder | 37-1 | 37-2 | 37-3 |
| Reference resistor | R1 | R2 | R3 |

The storage contents of the decoders 37-1, 37-2, and 37-3 are as exemplarily shown in FIG. 2a, FIG. 2b, and FIG. 2c as mentioned above, but, as shown in FIG. 2a, when the input to the decoder 37-1 is 501, it outputs a signal "H1". Likewise, when the input to the decoder 37-2 is 501, it likewise outputs a signal "H2". Thereby, the sampling control unit 41 is notified of the point of changing over into the high temperature range in each case. And when the input to the decoders 37-2 and 37-3 are 99, they produce signals "L2" and "L3", and they notify the sampling control unit 41 that the point of changing into the low temperature range has been reached.

The reference resistors R1, R2, and R3 have resistive values which correspond to the resistive values of the temperature sensitive resistor at the median temperatures of the temperature ranges, or 15.0 deg C., 37.00 deg C., and 39.0 deg C.

Now, the action of the above described electronic thermometer will be described, with reference to the flow chart given in FIG. 4. This flow chart is introduced here for the convenience of description and it does not necessarily represent the control programs stored in the storage means of the electronic thermometer of this embodiment.

When the action starts, an initialization process is executed (in the step 1). According to this initialization process, the sampling control circuit 41 is set to the low temperature range, and the switchover switches 14 and 44 are selected to R1 and T1, respectively, while the bus buffers 36-1 and 38-1 and the decoder 37-1 are selected.

When the switch 14 of the oscillation unit 1 is thrown towards the resistor R1 of the reference resistor set 12, the oscillation signal from the oscillation unit 1 based upon the reference resistor R1 starts being counted (in the step 2). In other words, the oscillation unit 1 starts oscillating at a frequency F0 according to a time constant which is determined by the resistive value of the selected reference resistor R1, R2 or R3 from the set 12 thereof, and also of course by the static capacitance C of the capacitor 15. A pulse signal of this frequency F0 is outputted from the oscillation circuit 17 and is inputted to the counter 20. Then, the counter 20 starts counting the pulse signal of this frequency F0. At the same time, the count of the clock signal of frequency FC from the clock oscillation unit 23 is started by the counter 24. When the count of the counter 20 reaches a certain value N0, its overflow output is supplied to the latch circuit 25 by way of the AND circuit 22, and the count of the counter 24 is latched to the latch circuit 25.

The overflow output of the counter 20 is supplied to the SET INPUT terminal of the flip-flop 18 after a slight time delay produced by the delay circuit 21, and the flip-flop circuit 18 is reset. The inverted output of the flip-flop circuit 18 is supplied to the switch 14 by way of the NOR circuit 19 to throw the switch 14 towards the thermistor 11 and to clear the counters 20 and 24 by way of the OR circuit 30.

Then, the oscillation signal from the oscillation unit 1 uses the resistance Rx of the thermistor 11 (in the step 3). In other words, the oscillation unit 1 oscillates according to a time constant determined by the resistive value Rx of the thermistor 11 and the electrostatic capacitance C of the capacitor 23, and a pulse signal of frequency Fx is outputted from the oscillator unit circuit 17 to the counter 20. And thereafter the counter 20 counts the pulse signal of frequency Fx. Meanwhile, the counter 24 receives a clock signal of frequency Fc from the clock oscillator unit 23 to be counted by the counter 24. And when the count of the counter 24 agrees with the count retained in the latch circuit 25, the comparison circuit 26 stops at the occurrence of agreement. If the count of the counter 20 at this moment is Nx, it is known that the following relationship holds between the absolute temperature T and the count Nx:

$$\text{EQUATION } T = \cfrac{1}{\cfrac{1}{T} - \cfrac{1}{B} \cdot \ln \cfrac{NxRo}{NoR}}$$

where B is Boltzmann's constant and R0 is the resistive value of thermistor 11 at absolute temperature T0. Therefore, once Nx is determined, it is possible to find the temperature T from Nx, since the other values are constants.

Then, the count Nx of the counter 20 and the count which has been retained in the latch circuit 28 are compared by the comparison circuit 29 (in the step 4), and, if the count of this time is greater, i.e. if the temperature has risen, then the output of the comparison circuit 29 turns to logical "1". And this signal is supplied to the numerical value update control circuit 32 by way of the AND circuit 31, and the numerical value update control circuit 32 supplies a signal to the latch circuit 28 by way of the NOR circuit 34 and the OR circuit 35 at the timing of receiving a signal from the delay circuit 27, and latches the count Nx of the counter 20 to the latch circuit 28 (in the step 5). If the count of the counter 20 is smaller than the value retained in the latch circuit 28, the step 5 is skipped. In either case, the value (which corresponds to the temperature in the range of from 100 to 500) retained by the latch circuit 28 is supplied to the decoder 37-1 by way of the bus buffer 36-1, and the decoder 37-1 reads out temperature data corresponding to the inputted digital value (in the step 6) and supplies it to the display unit 4 by way of the bus buffer 38-1. And, in the sampling control circuit 41, it is determined whether the signal Hn (H1) exists or not (in the step 7). If the inputted count is 500 or less, since the signal "H1" is not outputted from the decoder 37-1, then the determination results become NO. Then, it is determined whether the signal Ln exists or not (in the step 8), and since this determination result is NO the temperature data is displayed on the display 40 in the display unit 4 (in the step 9). And when the timer 43 times up (elapse of the sampling time T1), then the output of the timer 43 is supplied to the switch 14 by way of the NOR circuit 19, thereby throwing the switch 14 towards the reference resistor R1 again, and causing the actions for the following sampling time.

Now, if the temperature measurement is for measuring body temperature and the measured temperature has not yet reached 35 deg C., the steps two through nine are repeated for each sampling time, and a temperature which rises by the increments of 0.1 deg C. is displayed on the display 40.

When the temperature has exceeded 35 deg C. and the digital value latched in the latch circuit 28 has become 501, a signal "H1" is produced from the decoder 37-1. Since this signal "H1" means that a point of changing the range of temperature measurement has been reached, the determination result as to whether it is "Hn" signal or not in the step 7 becomes YES, and the sampling time of the timer 43 is switched over to Tn+1 or T2 in this case, the resistive value of the reference resistor set 12 to Rn+1 or R2 in this case (in the step 10), and the bus buffers 36-2 and 38-2 and the decoder 37-2 are connected (in the step 11). Further, the latch circuit 28 is reset by the sampling control circuit 41 by way of the OR circuit 35 (in the step 14). By the above described processes, the following measurement is executed with the sampling time of T2, the reference resistance value of R2, and using the decoder 37-2. The resolution power in this case is 0.01 deg C. In other words, in this range, a body temperature measurement of high resolution power is possible. However, when the sensor (the thermistor 11) is placed away from the body and the detected temperature drops below 35 deg C., the count value retained by the latch circuit 28 falls below 99, and an "L2" signal is outputted from the decoder 37-2 to be supplied to the sampling control circuit 41 by way of the AND circuit 42c, so that the sampling control circuit 41, due to the existence of the signal "L2", changes the sampling time of the timer 43 to Tn−1 or T1 and the resistance value of the reference resistor set 12 to Rn−1 or R1 back again (in the step 12). Further, the bus buffers 36-1 and 38-1 and the decoder 37-1 are selected (in the step 13), and the latch circuit 28 is likewise reset.

On the other hand, if the temperature has risen above the temperature range of 35 deg C. to 39 deg C. and the count value retained by the latch circuit 28 exceeds 500, a signal "H2" is outputted and supplied to the sampling control circuit 41 by way of the AND circuit 42b. Upon receipt of this "H2" signal, the sampling control circuit 41 changes the reference resistor to R3, the sampling time to T3, and selects the bus buffers 36-3, 38-3, and the decoder 37-3. As a result, the resolution power again becomes 0.1 deg C. And if the temperature falls below 39 deg C. during this process and the count value retained by the latch circuit 28 falls below 99, a signal "L3" is outputted from the decoder 37-3 and the sampling control circuit 41 changes the reference resistor, the sampling time, and the decoders for the temperature range of from 35 deg C. to 39 deg C.

Thus, according to the electronic thermometer of this embodiment, when the measured temperature has exceeded a certain range, the reference resistor, the sampling time, and the decoder for the temperature data conversion are switched over. Therefore, it is possible to carry out temperature measurement over a wide range without increasing the number of bits of the counter or the storage capacity of the decoder.

Although in the above embodiment the reference resistors, the sampling times, and the decoders are switched over to any one of the three selections, and the resolution power was changed over the three levels, it is also possible to change it over two levels or over four or more levels.

Further, in the above described embodiment, the resolution power was higher in the range of 35 deg C. to 39 deg C. than in the other ranges, but, depending upon the intended application, it is possible to modify the temperature range over which the resolution power is high.

Thus, according to this invention, it is possible to obtain a wide range of temperature measurement and measurement of high resolution power is possible over a certain temperature range without increasing the number of bits of the counter incorporated in the comparison means, and the storage capacity of the temperature data comparison storage means. Therefore, it is possible to use one electronic thermometer as both a room temperature meter and a clinical thermometer, for example. And when it is used as an electronic clinical thermometer, the low resolution temperature display eliminates any irritation of the user during the phase in which the desired temperature range has not been reached. And, when it is used as a clinical thermometer, it is possible to recognize the changes in the display during measurement, and it is possible to get a good idea how soon the measurement will be complete.

Although the present invention has been shown and described in terms of certain preferred embodiments thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the legitimate and properly interpreted scope of the accompanying claims, which follow.

What is claimed is:

1. An electronic thermometer, comprising:
    (a) an oscillation unit comprising:
        a time constant circuit comprising:
        (i) a resistor device comprising a reference resistor means having selectable plural discrete resistance values and a temperature sensitive resistor means; and
        (ii) a switch-over means for switching over said resistor device between said reference resistor means and said temperature sensitive resistor means;
    (b) a sampling time switching means cooperating with said switch-over means to periodically switch over said resistor device between said reference resistor means and said temperature sensitive resistor means at one of plural selectable predetermined sampling intervals, in accordance with a selected range of temperature measurement;
    (c) a comparison means for comparing oscillation frequencies of said oscillation unit, said comparison means comprising means for outputting digital data corresponding to a temperature sensed by said temperature sensitive resistor means;
    (d) a temperature data conversion means, receiving said digital data corresponding to said sensed temperature, for converting said digital data to a corresponding temperature data output;
    (e) a means for displaying said temperature data output;
    (f) means for selectively switching said reference resistor means from one to another of said resistance values according to the selected range of temperature measurement;
    (g) said temperature data conversion means comprising a plurality of selectable operating sections which are individually switchably selected according to said selected range of temperature measurement, each of said operating sections outputting, upon receipt therein of said digital data from said comparison means, a temperature data output corresponding thereto;
    (h) a temperature data conversion means switching means for switching between said selectable operating sections of said temperature data conversion means; and
    (i) a switching control means which, in response to said temperature data output, determines switching of the range of temperature measurement, and controls (i) said means for selectively switching said reference resistor means, (ii) said sampling time switching means, and (iii) said temperature data conversion means switching means.

* * * * *